United States Patent [19]
Koai

[11] Patent Number: 5,526,152
[45] Date of Patent: Jun. 11, 1996

[54] REPEATER-LESS MULTIGIGABIT LIGHTWAVE BUSES WITH OPTICAL AMPLIFIERS

[75] Inventor: Kwang-Tsai Koai, Concord, Mass.

[73] Assignee: GTE Laboratories Incorporated, Waltham, Mass.

[21] Appl. No.: 127,189

[22] Filed: Sep. 24, 1993

[51] Int. Cl.$^6$ .................................................. H04B 10/20
[52] U.S. Cl. ........................ 359/118; 359/158; 370/124; 370/74
[58] Field of Search .................. 359/118–119, 125–126, 359/137, 152, 158, 164, 166–167, 173, 179, 188, 195; 370/74, 98, 105.5, 110.3, 124

[56] References Cited

U.S. PATENT DOCUMENTS

| | | | |
|---|---|---|---|
| 4,641,375 | 2/1987 | Dean | 370/74 |
| 4,730,301 | 3/1988 | McMahon | 359/119 |
| 4,768,186 | 8/1988 | Bodell | 359/182 |
| 5,185,814 | 2/1993 | Healey | 359/160 |

FOREIGN PATENT DOCUMENTS

| | | | |
|---|---|---|---|
| 0222533 | 9/1989 | Japan | 359/118 |

OTHER PUBLICATIONS

Cheung et al., "Estimated–Queue Expanded Bus (EQEB) Protocol for Single–Hop Multichannel Lightwave Networks" Electronics Letters vol. 28, No. 9, 23rd Apr. 1992. pp. 855–857.

Abeysundara et al., "Z–Net: A Dual Bus Fiber–Optic LAN Using Active and Passive Switches". IEEE, 1989. pp. 19–27.

*Primary Examiner*—Leo Boudreau
*Assistant Examiner*—Kinfe-Michael Negash
*Attorney, Agent, or Firm*—Lawrence E. Monks

[57] ABSTRACT

Apparatus is disclosed which is advantageously used in local area, metropolitan-area, and wide-area optical networks having a dual bus architecture, permitting significantly increased distance before termination or regeneration of the optical signal. A portion of the received optical signal is tapped from a fiber, converted to an electrical signal, before presentation to a node. That remaining portion of the received optical signal enters a fiber delay line and is amplified by an optical amplifier. Data to be transmitted from a node is converted from an electrical signal to an optical signal and transmitted on the bus.

5 Claims, 5 Drawing Sheets

5,526,152

REPEATER-LESS MULTIGIGABIT LIGHTWAVE BUSES WITH OPTICAL AMPLIFIERS

FIELD OF THE INVENTION

This invention relates generally to local area, metropolitan-area, and wide-area networks using a dual bus architecture, and more particularly to a dual bus network design having significantly increased distance before termination or regeneration of the optical signal, and for most practical purposes no regeneration is necessary.

BACKGROUND OF THE INVENTION

Significant demand for gigabit metropolitan-area networks (MAN) and wide-area networks (WAN) is surfacing and several experimental networks are in the process of being implemented. These networks use electronic repeaters to regenerate the signal at each node before further retransmission. Regenerative repeaters, however, impose performance and reliability constraints due to the electronic processing at each node, which thus limits the operating data rates of the network. Further, a single component failure may compromise the integrity of the entire network. Moreover, these topologies rely on technology that still needs significant improvement.

For gigabit networks without repeaters, considerable interest has been focused on wavelength division multiplexed (WDM) star networks as described in "Dense Wavelength Division Multiplexing Networks: Principles and Applications" by Charles A. Brackett in the *IEEE Journal on Selected Areas in Communications*, Vol. 8, No. 6. August 1990, and most recently ring networks using distributed optical amplification as described in "Optical Ring Networks with Distributed Amplification" by Evan Goldstein in *IEEE Photonics Technology Letters*, Vol. 3, No. 4, April 1991.

Dual bus networks, using a Distributed Queue Dual Bus (DQDB) protocol as described in Distributed Queue Dual Bus Subset of a Metropolitan Area Network, IEEE, New York, July 1990 are an attractive choice for MAN and WAN environments because of excellent network survivability and flexibility. DQDB networks have shown quite efficient operations even when the data rate is high or the propogation delay over the network is large.

The IEEE 802.6 standard using the Distributed Queued Dual Bus (DQDB) architecture is emerging as an international standard for MAN with data rates up to 155 Mb/s. However, a repeater-less multigigabit dual bus network with optical amplifiers and passive fiber access for MAN and WAN is desirable in order to support a large number of nodes for connectionless data services, spread over a wide geographic area, with use of currently available technology.

OBJECTS OF THE INVENTION

It is a primary object of the invention to obviate the above noted disadvantages of the prior art.

It is further object of the invention to provide for a dual bus communications network using optical fiber to implement each bus.

It is a yet further object of the invention to provide for a dual bus communications network with increased distance before regeneration of the signal is required.

It is a still further object of the invention to provide for a dual bus communications network wherein the signal is not regenerated at each node.

SUMMARY OF THE INVENTION

These and other advantages and objects of the invention are provided for herein.

In one aspect of the invention, an N-node looped bus network, having a head node and N-1 intermediate nodes, operates according to the DQDB architecture with dual optical fibers, acting as Bus 1 and Bus 2 respectively. Two lightwaves at different wavelengths are used to carry the system clock from the head node and connectionless data cells or packets to and from all nodes. The data on the network is bit synchronized by a continuous clock provided by the head node, using one lightwave carrying a pilot tone at the high end of the signaling band. Data cell or packet framing is accomplished by periodically inserting a code word onto each bus from the head node. At the end of the bus, both lightwaves are terminated.

In a further aspect of the invention, an intermediate node connects to each bus via two directional coupler taps, one to receive signals from the bus and one for transmitting onto the bus. The receiver and transmitter directional coupler taps are coupled to a receiver and transmitter respectively. A fiber delay line may be inserted between the directional taps, and an optical amplifier is configured inline after the transmit directional coupler. This configuration advantageously provides for an optical network allowing for increased distance over conventional DQDB networks between intermediate nodes, and increased network integrity in the event of a receiver or transmitter failure at a node due to the deceased need to regenerate the signal at each intermediate node.

DETAILED DESCRIPTION OF THE INVENTION

Figure 1:
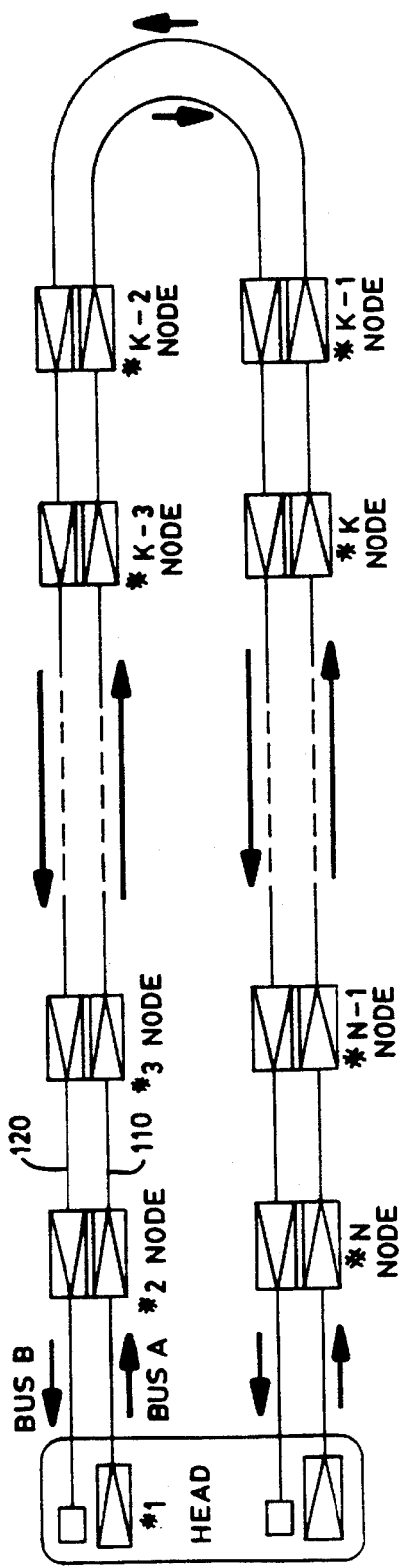
FIG. 1 is an illustration of a dual bus communication network in which the current invention may be utilized.

A network of N nodes, configured in a dual bus architecture, is shown in FIG. 1. The nodes on the network may be general purpose computers, personal computers, or electronic devices performing specialized applications. In one embodiment of the invention, the dual bus architecture operates according to the IEEE 802.6 standard for metropolitan-area networks (MAN), IEEE 802.6< Distributed Queue Dual Bus Subnet of a Metropolitan Area Network, IEEE, New York, July 1990, which is incorporated by reference herein. However, one of ordinary skill in the art will recognize that the inventions disclosed herein are not limited to the IEEE 802.6 standard but may be applicable to other dual bus configurations. Each node on the network connects to Bus A 110 and to Bus B 120. Bus A 110 and Bus B 120 are implemented as optical fibers. Each node in the network may transmit and receive on both Bus A 110 and Bus B 120. Node 1 is designated the head of the bus, while the other nodes are designated as intermediate nodes. As shown in FIG. 1, in one embodiment of the invention both Bus A 110 and Bus B 120 loop from the head of bus, node 1, through the intermediate nodes and return back to the head of the bus, node 1. In another embodiment of the invention, the head nodes of Bus A 110 and Bus B 120 are not located at the same geographical location, thus forming an open dual bus configuration.

Figure 2B:
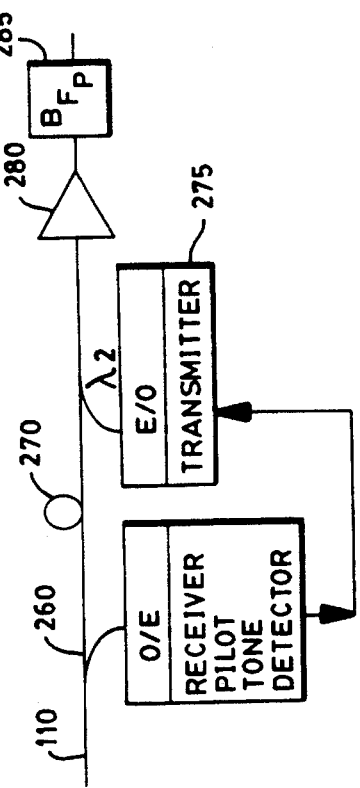
FIG. 2b depicts the connections for an intermediate node to a bus in accordance with the current invention.
Figure 2A:
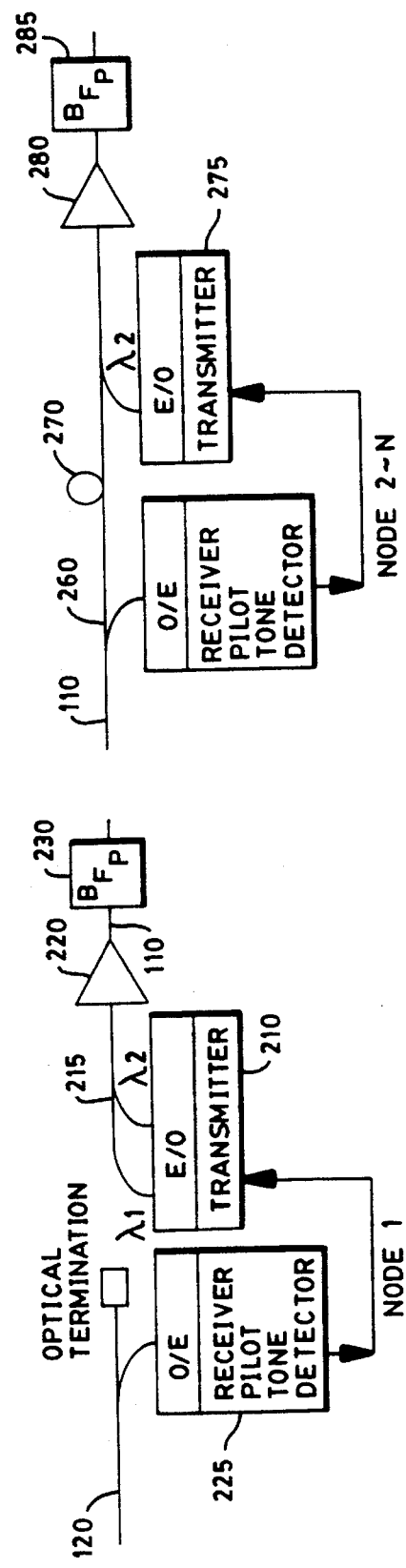
FIG. 2a depicts the connections for the head node to a bus in accordance with the current invention.

Referring now to FIG. 2a, the connection of the head of the bus node, node 1, to the optical bus will now be described. Node 1 interconnects to both Bus A 110 and Bus B 120. With the understanding that the connections to both Bus A 110 and Bus B 120 are the same for node 1, the connection for Bus A 110 will be described for exemplary purposes. Node 1 is coupled to Bus A 110 through an opto-electronic transmitter 210 for converting the electrical signals of node 1 to the optical domain for transmission on Bus A 110. Node 1 transmits two signals, one at wavelength $\lambda_1$ and the other at wavelength $\lambda_2$ which are coupled to Bus 110 via a passive fiber coupler 215, and the combined signal is amplified by optical amplifier 220. A bandpass filter 230 is utilized to reduce noise from the optiacl amplifier 220. An optical carrier at wavelength $\lambda_1$ is continuously transmitted on each bus from the head of bus. This carrier carries the system clock on a pilot tone to be used for network synchronization, and further stabilizes the gain for optical amplifier 220 and other down stream optical amplifiers associated with the intermediate nodes, which are described later. Node 1 transmits at wavelength $\lambda_2$ empty data slots which are delineated by code words for use of the intermediate nodes in transferring data.

Bus A 110 is terminated at node 1. An optical tap is used to tap the optical radiation from the bus, and converts a received signal from the optical dommain to the electrical domain at opto-electronic receiver 225 for processing at node 1. For the head node, the use of such a tap is optional depending on the signal power of the network.

Referring now to FIG. 2b, the connection of an intermediate node to the optical bus will now be described. While all intermediate nodes connect to either Bus A 110 or Bus B 120 in the same manner, Bus A 110 will be used for exemplary purposes. A 10 dB directional coupler 260 taps off a portion of the optical radiation from Bus A 110, which is presented to an opto-electronic receiver 265 for conversion to the electrical domain. The optical radiation received carries both a system clock for network synchronization by opto-electronic receiver 265 and the network data to be processed by the node. That portion of the optical radiation not tapped off at tap 265 continues on Bus A 110 through fiber delay 270 in order to delay the signal to allow the node to process the received data, and recognize empty bus slots for transmission by the node. One of ordinary skill in the art will recognize that in the event of a node failure, further transmission of the clock signal or data along the bus is not impeded since neither is regenerated at the node.

If a node desires to transmit data on Bus A 110, after the receiver identifies an emply data slot, the node sends the data to be transmitted to opto-electronic transmitter 275 for conversion from the electrical to the optical domain. Opto-electronic transmitter 275 is coupled to Bus A 110 by a passive directional coupler. Data is tranmitted into an empty bus slot using wavelength $\lambda_2$ and then amplified at optical amplifier 280. The output of the optical amplifier 280 is put through a bandpass filter 285 to reduce noise.

In accordance with the instant invention, a 10 Gb/s photonic bus with uniform node-to-node link loss and unified node designs as shown in Table 1 below is analyzed for performance.

| | |
|---|---|
| Data rate | 10 Gb/s |
| Node-node spacing (S) | 10 km |
| Node-node link loss (Li) including: | 9.0 dB |
| Fiber transmission loss (0.2 dB/km) | 2.0 dB |
| Fiber coupler loss (trasmitter) | 3.3 dB |
| Fiber coupler loss (receiver) | 0.7 dB |
| 2 optical isolators loss | 1.0 dB |
| Optical filter loss | 2.0 dB |
| Optical amplifier unsaturated gain | 12 dB |
| Optical amplifier Psat | 4 dBm |
| Optical amplifier noise figure (F) | 5 dB |
| Optical filter bandwidth | 2 nm |
| Optical carrier wavelengths ($\lambda1\&\lambda2$) | 1549 & 1550 nm |
| Fiber coupler ratio (transmitter) | 50% |
| Fiber coupler ratio (receiver) | 10% |
| Transmitter power input to amplifier | −6 dBm |
| Baseband data extinction ratio | 15 dB |
| Clock tone optical modulation index | 10% |
| Transmitter relative intensity noise (RIN) | −150 dB/Hz |
| Receiver average noise current density | 11pA/$\sqrt{Hz}$ |
| Receiver electrical bandwidth (data) | 7 GHz |
| Receiver electrical bandwidth (clock) | 20 MHz |

Figure 3:
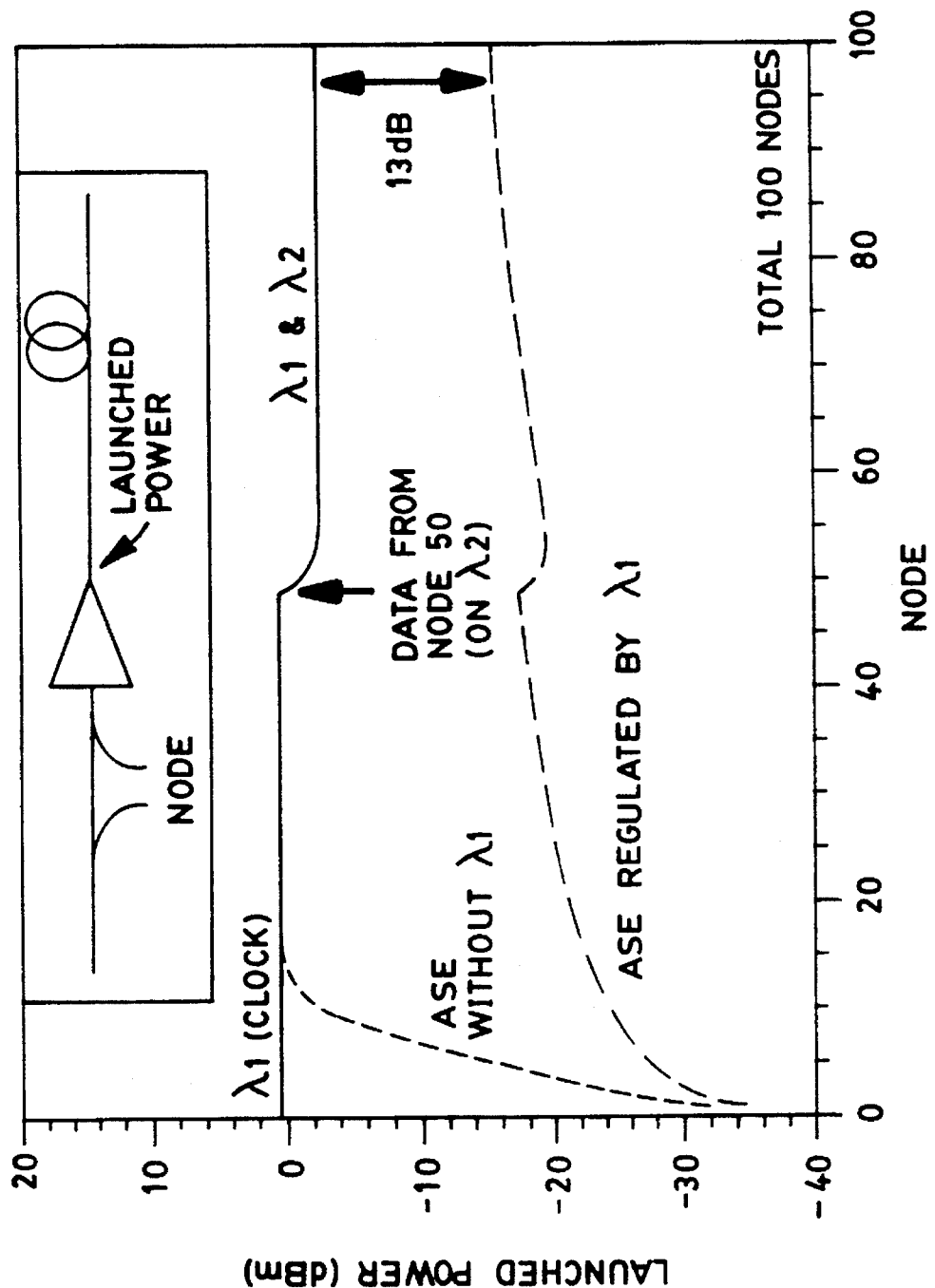
FIG. 3 is a graph of the launched optical power in dBm, assuming node 50 initiates the data transmission.

A DQDB comprising two such buses can have a network capacity approaching 20 Gb/s. The launched optical power at each node is shown in FIG. 3, assuming the network is being accessed by node 50 for data transmission. The maximum launched power is 0.5 dBm. The Kerr nonlinear effect is expected to be small for a total network span of $\leq 1000$ km. Starting from node 1, $\lambda 1$ (clock) decays gradually as the ASE builds up along the bus. At node 50, both ASE and $\lambda 1$ have a sharp drop of ~1.2 dB due to the injection of $\lambda 2$ (data) which causes further amplifier gain compression. In general, the ASE builds up to the highest level at the end of bus where the worst baseband bit error rate (BER) and clock carrier to noise ratio (CNR) are detected, with the signal-ASE beat noise dominant. With $\lambda 1$ transmitted from node 1, the ASE is regulated to a much lower level than that without as shown in FIG. 3. Without this regulation only about 6 nodes can be supported. The gain compression effect shown in FIG. 3 is for the steady state. For DQDB access, the access time for a node may be shorter than the settling time of the optical amplifier. Therefore the gain compression effect is dynamic but less drastic than shown. The required receiver dynamic range is only 2 dB, contrasting to photonic buses without optical amplification and ring networks with distributed amplification, where the received signal power may vary by as much as 20 dB.

Figure 4:
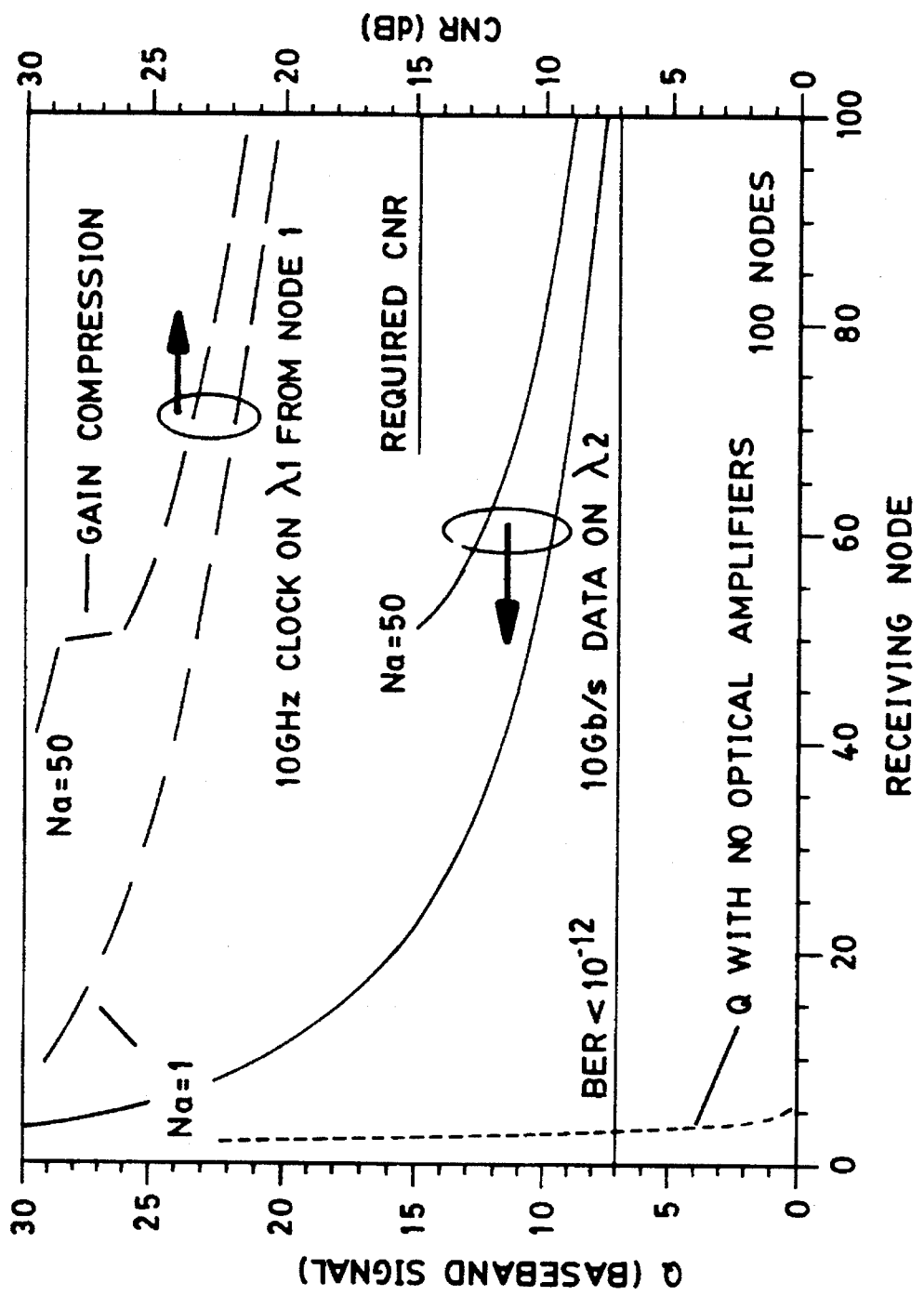
FIG. 4 shows the baseband Q parameter, voltage signal to noise ratio, and clock CNR at the downstream receiving nodes assuming the network is accessed by either node 1 or 50.

FIG. 4 shows the baseband Q parameter, voltage signal to noise ratio, and clock CNR at the downstream receiving nodes assuming the network is accessed by either node 1 or 50. In the case of node-50 access, the clock CNR has an abrupt reduction at the next downstream node (node 41) due to gain compression effect but the overall performance is still better than that of node-1 access. This is true for access by all other nodes also. Therefore a 100-node 10 Gb/s photonic bus with a total span of 1000 km may be possible with a worst BER of ~$2.5 \times 10^{-14}$ (Q~7.5) and a minimum CNR of ~20.3 dB. FIG. 4 also shows the calculated baseband Q with all optical amplifiers, isolators, and filters being removed. In this case, only 3 nodes can be supported.

Figure 5:
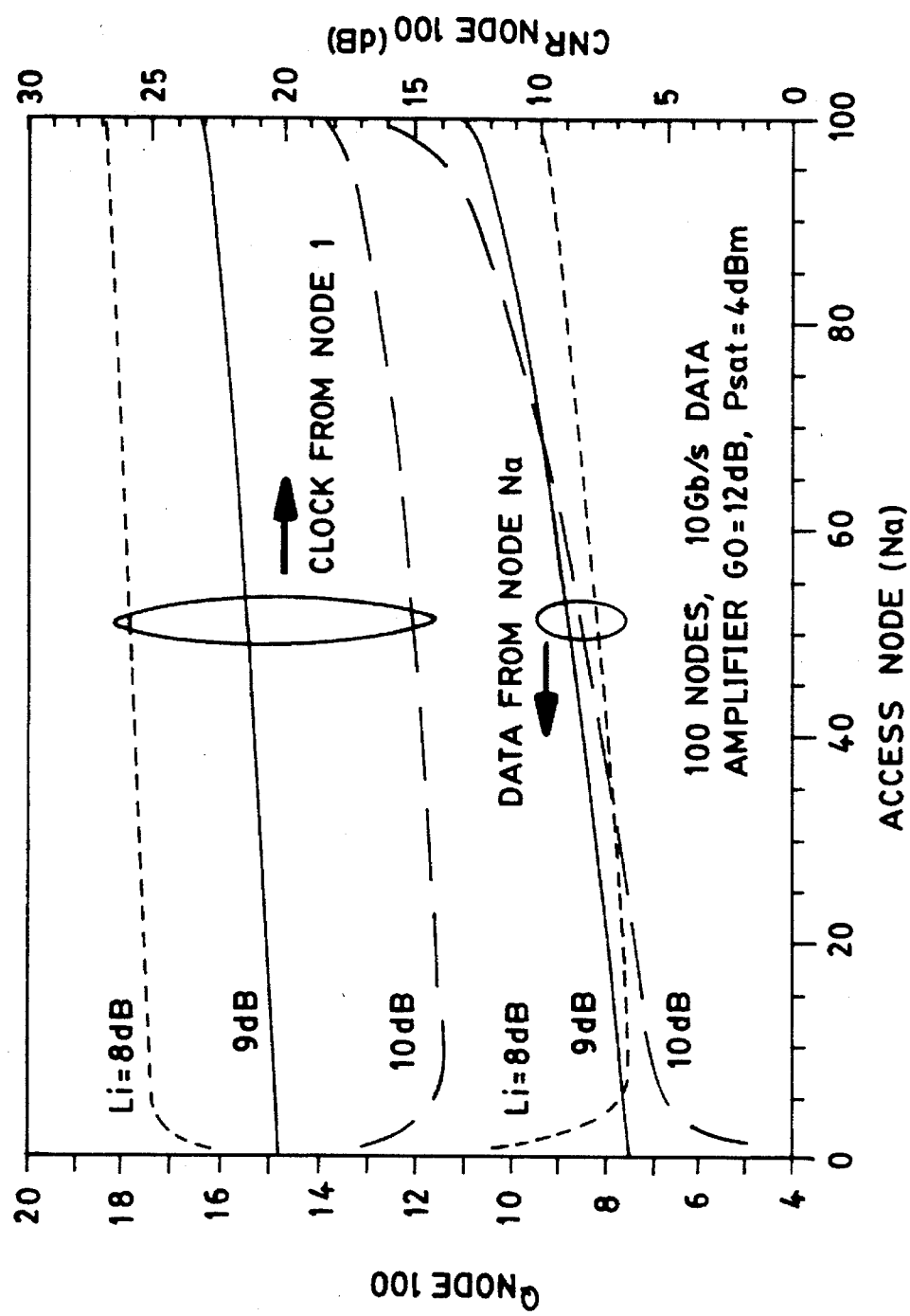
FIG. 5 is a graph of the the baseband Q and clock CNR at the end of a 100-node bus, versus all access nodes, assuming different values of link loss.
Figure 6:
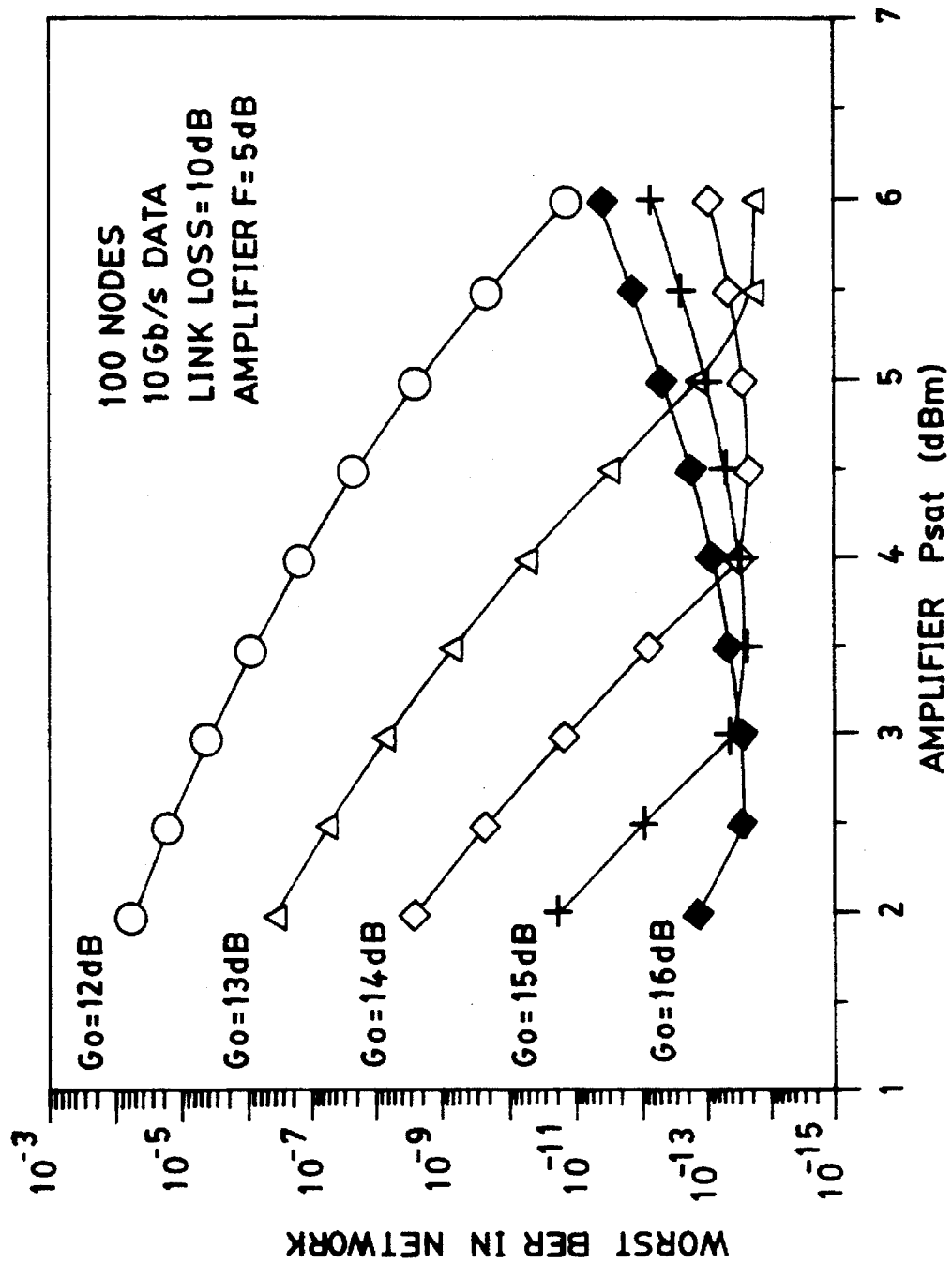
FIG. 6 shows a graph of worst BER plotted versus Go for a hundred node network.

In FIG. 5 the baseband Q and clock CNR at the end of a 100-node bus, are plotted versus all access nodes, assuming different values of link loss ($L_i$=8,9,10 dB). A worst network Q of ~7.5 (BER~$2.5\times10^{-14}$) is possible for $L_i$=10 dB($S \leq 10$ km), while the average Q is ~8.9 (BER~$3.3\times10^{-19}$). Such a bus is suitable for many MAN/WAN. For networks with larger link losses (e.g. $L_i$=10 dB), using the same optical node design results in lower overall transmission performance because not only the ASE grows, but λ1 and λ2 decay faster along the bus. In practice, the transmission performance of buses with known individual link loss can be optimized by adjusting $G_o$ and $P_{sat}$ of the optical amplifiers, as shown in FIG. 6 for a 100-node bus with $L_i$=10 dB. If G is only slightly higher than $L_i$ (e.g. $G_o$=12 dB), the required $P_{sat}$ is high (>6 dBm). Higher $G_o$ can reduce the required $P_{sat}$ but the amplifiers will be operated in deeper saturation. If $G_o$ is within 14–16 dB, good transmission performance can be achieved with $P_{sat}$<5 dBm.

The applications of the described lightwave buses can be LAN, MAN, or WAN, depending on the justification of economy. Within the fiber nonlinearity constraints, the geographical span of such networks is limited by fiber dispersion but can exceed 5,000 km if chirp-free transmitters and low-dispersion fiber are used. It is also possible to use soliton techniques to overcome the dispersion limit. A network protocol such as DQDB can be adopted for the proposed network. For high-capacity networks with large line lengths, the efficiency can be kept high by increasing the number of packets each node can send in a cycle, or by using a bandwidth balancing scheme as descibed in the DQDB architecture.

Multigigabit networks with reasonable efficiency supporting many nodes covering a large geographical area can be built with currently available technology. Since the most popular and flexible mesh networks can be built by the overlay of many bus networks, the described lightwave buses are potentially very useful for many applications in both public and private networks.

While there has been shown and described what is at present considered the preferred embodiment of the invention it will be obvious to those skilled in the art that various changes and modifications may be made therein without departing from the invention as defined by the appended claims.

What is claimed is:

1. A communications network having a head node and a plurality of intermediate nodes for transmitting data using an optical signal including data and a pilot tone for clocking said data comprising:

a dual bus means for transferring said optical signal from said head node to said plurality of intermediate nodes;

a tap means for tapping said optical signal producing a tapped optical signal;

receiver moans for receiving said tapped optical signal from the tap means including a pilot tone detector for detecting said pilot tone;

wherein said receiver means clocks said data of the optical signal and said received optical signal is not regenerated by an intermediate node.

2. The communications network of claim 1 wherein the dual bus means is a looped bus.

3. The communications network of claim 1 wherein the dual bus means is an open bus.

4. The communications network of claim 1 wherein the dual bus means is a fiber optic cable.

5. The communications network of claim 1 wherein the dual bus means operates in accordance with the DQDB architecture.

* * * * *